(12) United States Patent
Wacinski

(10) Patent No.: US 7,384,239 B2
(45) Date of Patent: Jun. 10, 2008

(54) DRIVE DEVICE FOR A WINDMILL PROVIDED WITH TWO COUNTER-ROTATIVE PROPELLERS

(75) Inventor: André Wacinski, Les Muriers (CH)

(73) Assignee: Eotheme Sarl, Bex (CH)

( * ) Notice: Subject to any disclaimer, the term of this patent is extended or adjusted under 35 U.S.C. 154(b) by 178 days.

(21) Appl. No.: 10/527,720

(22) PCT Filed: Sep. 16, 2003

(86) PCT No.: PCT/CH03/00625

§ 371 (c)(1),
(2), (4) Date: Sep. 14, 2005

(87) PCT Pub. No.: WO2004/027258

PCT Pub. Date: Apr. 1, 2004

(65) Prior Publication Data

US 2006/0093482 A1 May 4, 2006

(30) Foreign Application Priority Data

Sep. 17, 2002 (CH) .................... 1570/02

(51) Int. Cl.
F03D 1/02 (2006.01)
(52) U.S. Cl. .................... 416/128; 416/32; 415/18; 415/68; 415/123
(58) Field of Classification Search .................. 416/32, 416/128; 415/18, 60, 62, 65, 70
See application file for complete search history.

(56) References Cited

U.S. PATENT DOCUMENTS 2,153,523 A * 4/1939 Edmonds et al. ........... 416/128
2,653,250 A * 9/1953 Romani ........................ 290/44
3,974,396 A 8/1976 Schonball
4,316,698 A * 2/1982 Bertoia ........................ 416/11
4,642,029 A * 2/1987 Cedoz ........................ 416/129
5,054,998 A * 10/1991 Davenport ................. 416/129
5,506,453 A 4/1996 McCombs
6,127,739 A 10/2000 Appa
6,278,197 B1 8/2001 Appa

FOREIGN PATENT DOCUMENTS

| DE | 37 14 859 | 11/1988 |
|---|---|---|
| DE | 101 07 956 A1 | 8/2002 |
| EP | 1717489 A2 * | 11/2006 |
| FR | 1 078 401 A | 11/1954 |
| GB | 476 716 A | 12/1937 |
| WO | WO 96/11338 | 4/1996 |

* cited by examiner

Primary Examiner—Richard Edgar
(74) Attorney, Agent, or Firm—Pearne & Gordon LLP

(57) ABSTRACT

The drive device is provided for inclusion in a windmill with two counter-rotating screws. The shafts of the screws are each connected to a spindle of an epicyclical gearbox, the third spindle providing the energy for the user. The device further comprises a brake device simultaneously acting on the two shafts of the screws. In particular, said device permits the installation of a second screw on a windmill mast designed for a single screw on a windmill mast designed for a single screw, thus greatly increasing the power supplied.

16 Claims, 5 Drawing Sheets

DRIVE DEVICE FOR A WINDMILL PROVIDED WITH TWO COUNTER-ROTATIVE PROPELLERS

The content of Application PCT/CH2003/000625, filed Sep. 16, 2003, in Switzerland is hereby incorporated by reference.

BACKGROUND OF THE INVENTION

The present invention concerns an electrical generator's drive device, or that of any other mechanism that requires energy from a wind turbine provided with two counter-rotative propellers.

PRIOR ART

To this date, it is still common practice to commercialize windmills equipped with only one set of blades. Theoretically, the aerodynamic efficiency yielded by a single propeller cannot exceed 59.6% (Betz, A., "Wind-Energie und Ihre Ausnützung durch Windmuelen", van den Hoeck & Ruprecht, Goettingen, 1926). In practice, the output is actually even weaker (between 40 and 45% in the best conditions).

An attractive solution for higher global output consists in a mechanism including two counter-rotative sets of blades.

Several documents offer methods or drive devices with two propellers. Schönball (U.S. Pat. No. 3,974,396/1976) was one of the first to describe a mechanism composed of one set of blades driving a rotor, and another one driving the stator of the generator. Moreover, he provided the possibility of combining the stators and rotors to regulate the generator's electric excitation, thereby affecting the speed at which the blades rotate. As far as the cinematic chain was concerned, this device included a mechanical link between the two sets of blades.

Another famous patent, U.S. Pat. No. 5,506,453/1996, by McCombs, develops a system comprising two sets of blades that propel the rotor and stator directly, similarly to what is mentioned above. Thanks to a mechanism that enables to tilt the blades, the amount of revolutions yielded by the system can be regulated.

Both Appa patents U.S. Pat. Nos. 6,127,739/2000 and 6,278,197B1/2001 are based on a concept close to McCombs', as far as the drive of the generator is concerned. What distinguishes them from the previous ones, however, is how the blades are built; following the Appa model, the blades comprise longitudinal canals through which air is drawn in towards the center of the rotation, and then expelled at their tips by centrifugal force. The direction of the air outflow is tangential to the circumference described by the tips of the blades. Such a design increases the propeller's aerodynamic power.

Generally, the various mechanisms described above are inconveniently linked to the generator through a slow transmission shaft. Consequently, for any given power, the generator's dimensions and mass will be considerably larger, therefore calling for highly resistant supporting poles.

SUMMARY OF THE INVENTION

One of the first goals of the present invention is to propose a drive device for an improved windmill composed of two counter-rotative sets of blades. First of all, its efficiency will be better than the output yielded by single propeller constructions. Secondly, the improved windmill will be able to connect to a smaller generator, comparable in size to the one generally required by a single propeller windmill.

Thus the new device is designed to suit already existing infrastructures: the second set of blades will be mounted either right in front of or right behind the first propeller.

A close study of the annex illustration exposes further advantages of the invention:

DESCRIPTION OF THE PREFERRED EMBODIMENTS

Figure 1:
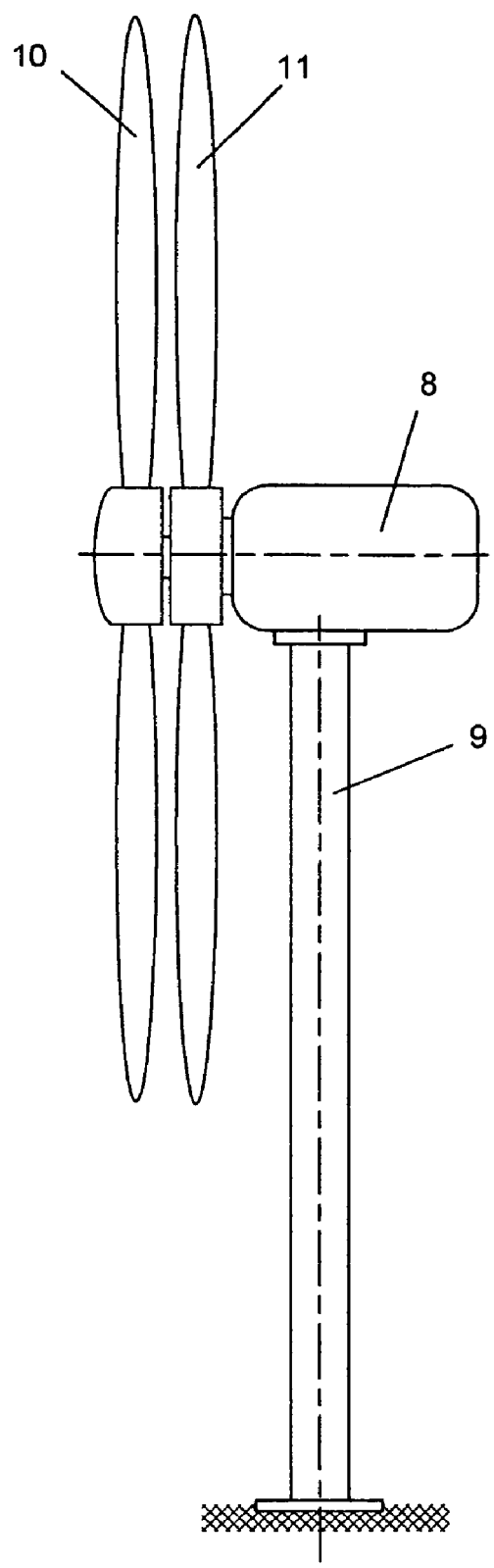
FIG. 1 indicates a general view of one side of the improved windmill.

FIG. 1 exposes a preferential display of counter-rotative propellers 10 and 11, both mounted windward and in front of tubular mast 9. The present invention involves setting the drive device and the generator inside nacelle 8.

Figure 2:
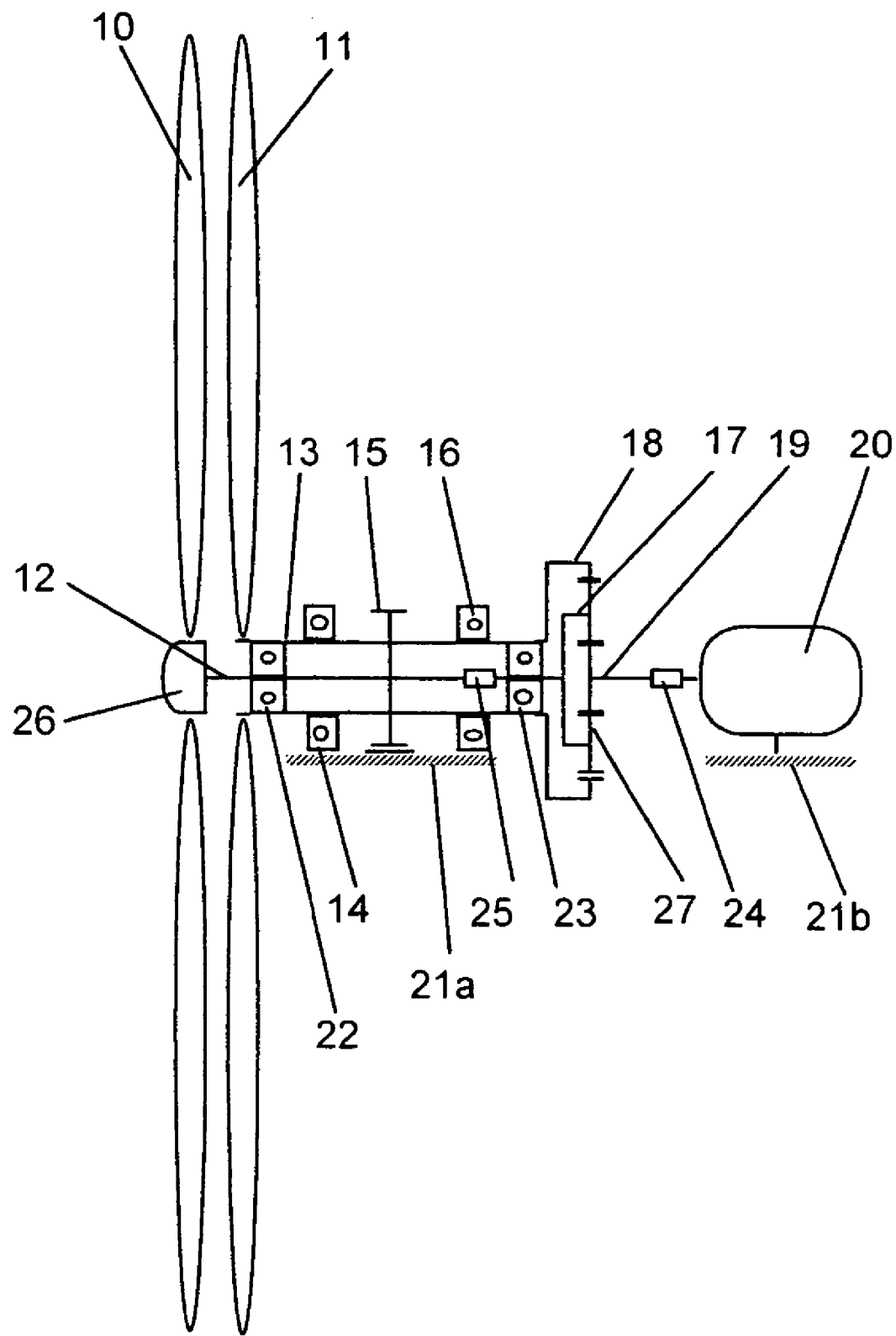
FIG. 2 displays a longitudinal section of a embodiment of drive device, built according to the invention, FIG. 3 provides a longitudinal section of another embodiment of drive device, built according to the invention.

A first embodiment of the drive device is indicated in FIG. 2. The first set of blades 10 and its hub 26 are supported by shaft 12, itself piloted by bearings 22 and 23 located inside hollow shaft 13. The second set of blades 11 is supported by hollow shaft 13, itself piloted by bearings 14 and 16. These two bearings 14 and 16, as well as portion 21a of the main armature of nacelle 8, are interdependent. Shafts 12 and 13 are coupled with an epicycloidal multiplier, wherein shaft 12 is coupled with train of planetary wheels 17, which in turn is linked to the epicycloidal multiplier; hollow shaft 13 is coupled with crown wheel 18 of the epicycloidal multiplier. The solar wheel activated by the epicycloidal multiplier is coupled with shaft 19, which in turn drives generator 20 through coupling 24. Since propellers 10 and 11 are counter-rotative, crown wheel 18 and train of planetary wheels 17 turn counter-rotatively as well. Power is therefore transmitted from shafts 12 and 13 to the generator shaft 19 through planetary gearings 27; these gearings are linked to train of planetary wheels 17 incorporated in the epicycloidal multiplier.

Figure 3:
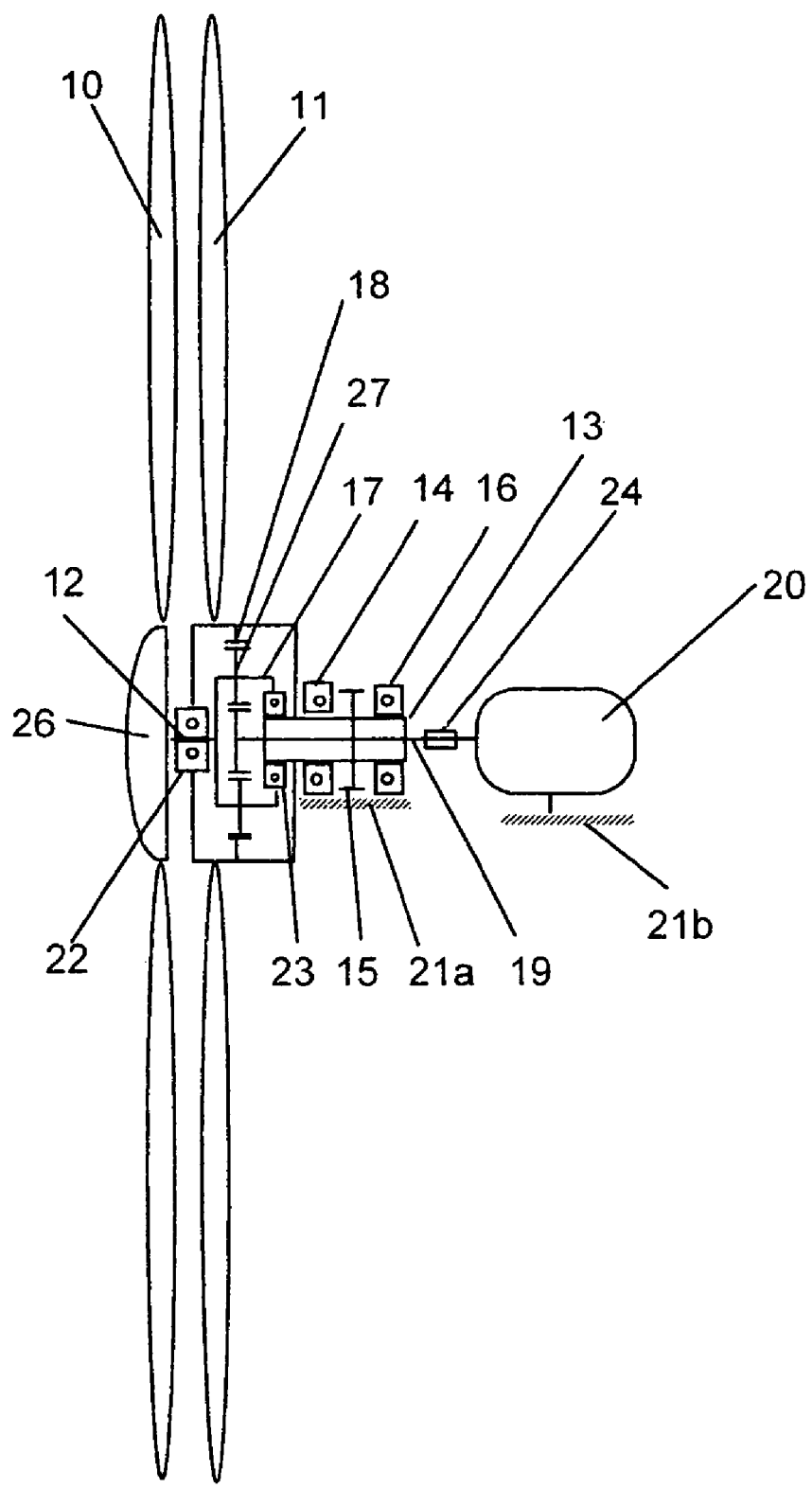

FIG. 3 provides a second embodiment of the drive device proposed by the invention. In this case, the epicycloidal multiplier is directly implanted in the hub of one of the propellers. Propeller 10 is piloted by bearings 22 and 23 and is linked to shaft 12 through train of planetary wheels 17, while the train of wheels itself is implanted between the two bearings. Propeller 11 is directly mounted onto crown wheel 18, which in turn is connected to shaft 13 operated by bearings 14 and 16. Shaft 19 is linked on one side to the solar wheel, and on the other, to generator 20 through coupling 24.

Ultimately, both drive models function in similar ways.

The speed at which shaft 19 operates generator 20, as well as its drive couple are proportional to respectively the rotation speed and the couple yielded by propellers 10 and 11, respectively mounted on shafts 12 and 13. Propeller 10 and shaft 19 rotate in the same direction.

It will therefore be preferable that both propellers turn at the same speed.

Appropriate aerodynamic profiles cause the sets of blades to spin counter-rotatively. As far as the specific regulation of revolutions generated by the propellers is concerned, it may be achieved through already familiar solutions.

Figure 4:
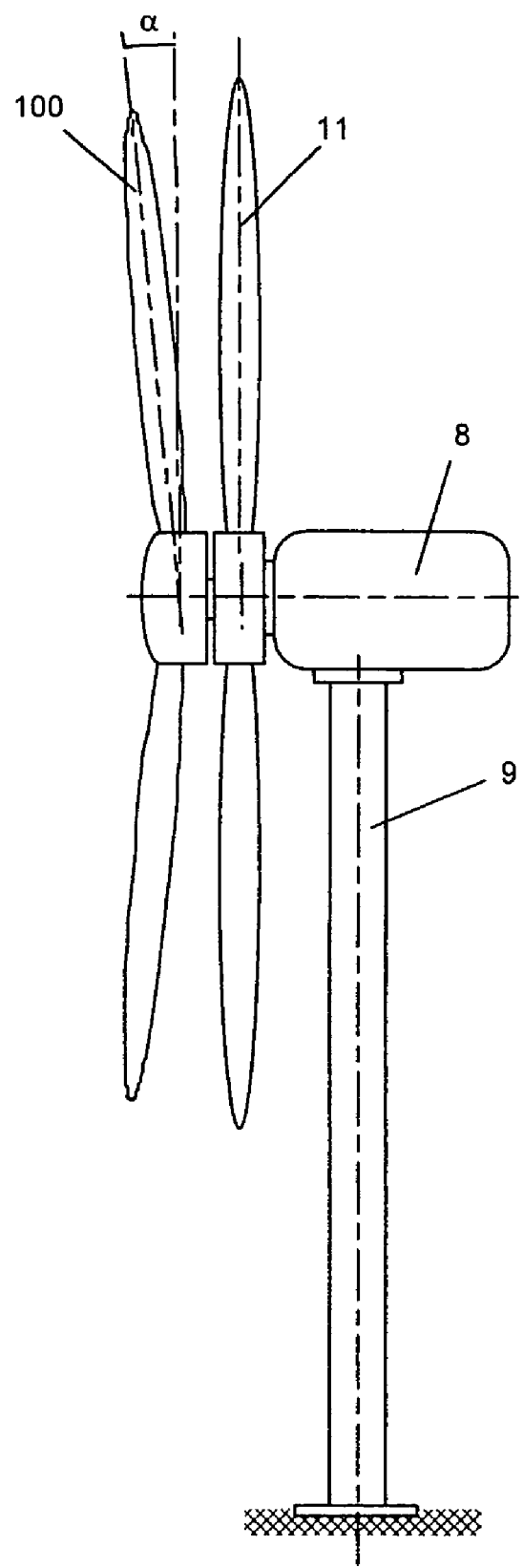
FIG. 4 shows various relative settings of both propellers, viewed laterally.
Figure 5:
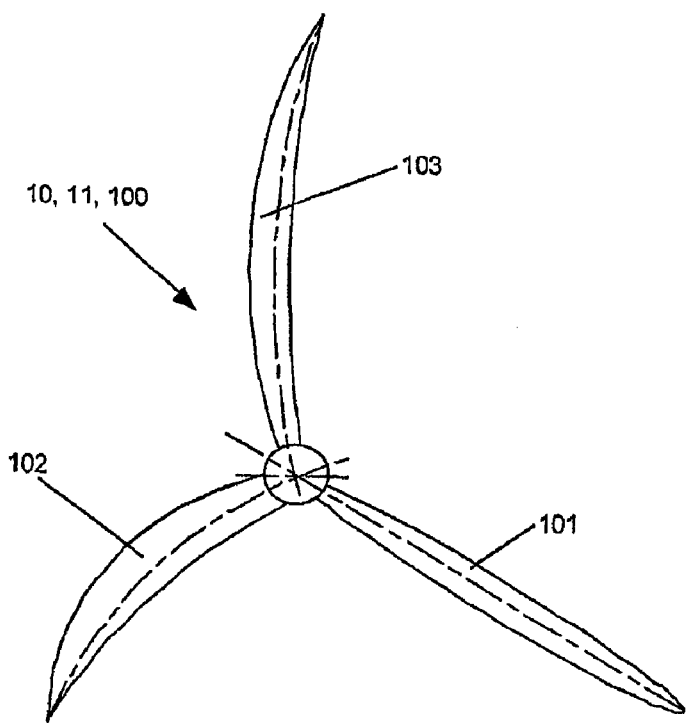
FIG. 5 is a frontal view of various propeller shapes.

Since both sets of blades stand in the same air flow, measures may be taken to have them rotate at the same speed. FIGS. 4 and 5 indicate various solutions in the propellers' disposition and shape: these various aerodynamic adjustments will affect the speed and the couple yielded by each set of blades.

A first solution consists in using two identical propellers 10 and 11, given that both have the same exterior diameter and number of blades; likewise, their rotation planes should be parallel, as indicated in FIGS. 2 and 3.

FIG. 4 provides a second alternative, in which the rotation planes are not parallel. In this example, the first propeller 100 rotates on a conical surface, the point of which is directed towards nacelle 8. In another case, the point might aim in the opposite direction of the nacelle. Angle α, enclosed between the rotation surface and the plane perpendicular to the propeller's rotation plane, is generally below 10°. Preferably, angle α should be below 5°, indeed better still below 30. In a third instance, either propeller 11 alone rotates on a conical surface, or both propellers rotate on two conical surfaces. In the latter case, it is not absolutely necessary that both angles α be identical; one could conceive having two conical surfaces with points directed towards one another, or turned away from each other.

FIG. 4 exemplifies yet another alternative: the exterior diameter of the first propeller—represented here by its lower blade—may be different from that of the second propeller, preferably smaller. Such a difference in diameter may be applied to a pair of propellers rotating on two parallel planes, as well as to a pair of propellers of which one at least turns on a conical surface.

FIG. 5 provides various blade shapes: propeller 10, 11 or 100 may bear blades 101, 102 and 103. Blade 101 is absolutely conventional: its axis is rectilinear and perpendicular to the rotation axis. Blade 102 has a curved axis. Likewise, blade 103 has a curved axis, but it is smaller in length to the blades on the second propeller. These blade shapes may be built on a propeller rotating either on a plane perpendicular to its rotation axis, or on a conical surface. All blades of any given propeller will obviously have the same shape and dimensions; however, blade shapes and dimensions may vary between two propellers of a same windmill. Alternative shapes and configurations can be envisaged to harmonize the speed and couple between both propellers.

Therefore, the choice of blade shapes and dimensions will depend on the wind regime the wind turbine undergoes; the ultimate goal will be to harmonize the couple and rotation speed between the two propellers.

Figure 6:
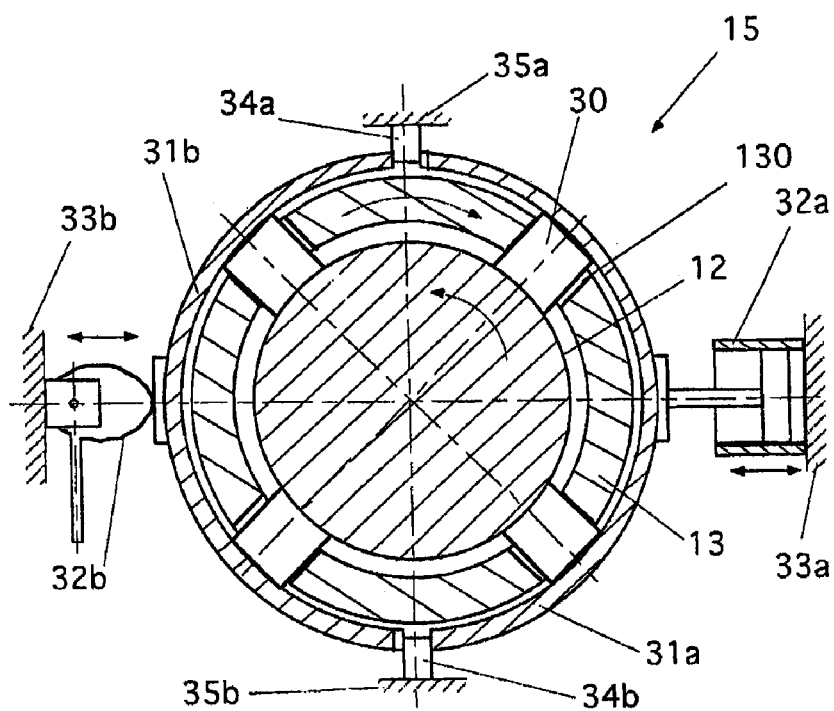
FIG. 6 presents a transversal section of the braking system designed for the drive device proposed by the invention.

Generally, windmills include an inbuilt braking device for their propellers. A windmill assembled with one of the drive devices described above may incorporate an ordinary braking mechanism. However, the following example is especially appropriate for the windmill model demonstrated above: FIGS. 2 and 3 outline such a braking system, represented in 15 and developed in more detail in FIG. 6.

Following the first embodiment of drive device indicated in FIG. 2, braking mechanism 15 is designed to act simultaneously on coaxial shafts 12 and 13, each bearing a propeller. The braking mechanism comprises two half-drums 31a and 31b built around hollow shaft 13 and acting on a plurality of tappets 30 located in the radial openings 130 arranged around shaft 13. As implied in the plan, tappets 30 rotate as the wind turbine operates, driven by shaft 13. Though the plan does not indicate them here, configurations permitting a loose working between tappets 30 and shaft 12, as well as between tappets 30 and half-drums 31a and 31b, do exist: unnecessary heating and friction loss are therefore avoided.

Activation devices such as hydraulic, pneumatic or electro-mechanical jacks (32a), or mechanical devices such as cam systems (32b), can be operated to draw half-drums 31a and 31b closer to each other: consequently, these will press against shaft 13 to slow it down, as well as press against tappets 30 that will, in turn, slow down shaft 12. Locking systems outlined in 34a and 34b prevent half-drums 31 and 31b from rotating at locations 33a, 33b, 35a and 35b of the frame.

In this case, reaction due to the braking pressure applied by tappets 30 on shaft 12 is used by spacings 130 incorporated in shaft 13. The final reaction on frames 35a and 35b of the nacelle will correspond to the difference between these two couples. This reaction will therefore be weaker than that of a single propeller braking device.

The amount of tappets 30 depends on technical parameters; preferably however, the tappets must be of pair number.

Instead of two half-drums 31a and 31b, an alternative pressure device on the tappets of shaft 13 consists in elaborating a ribbon braking system.

Following the second embodiment of drive device, indicated in FIG. 3, the braking system will be designed to act on shafts 13 and 19 simultaneously, as described above.

The above description mentions that the wind turbine produces energy for a generator; it is quite obvious that the drive device put forward by the present invention is applicable to all windmills producing energy through torque for any type of industry fit to receive it.

A first advantage of the present invention is to propose a device that substantially enhances the aerodynamic efficiency of a wind turbine. This is exemplified by the possibility of extracting more energy out of a land or sea surface allocated to an wind farm.

Another advantage of the proposed invention is to work out a solution whereby power increase depends on higher relative rotation speed, and not on higher torque of the cinematic chain. Therefore, the dimensions of both the drive device and its generator remain similar to those of a single propeller drive device. Moreover, the multiplying coefficient of the speed multiplier can be divided by two (i.e. the previous multiplication, 20-30, now ranges between 10 and 15). This may be achieved by a simple planetary, one-level multiplier.

A further advantage consists in keeping the mechanical reaction of the drive device on the mast (tower) at an acceptable level, despite the power increase. Indeed, while the windward reaction increases, the reaction due to the torque of one of the propellers is absorbed by the other propeller; thus the system achieves almost total balance within the perpendicular plane facing the air flow. Another propeller can therefore simply be added to the wind turbine, originally built with a single propeller and a mast designed to support only one set of blades.

Yet another advantage is the braking system provided for the two propellers: it is indeed designed in such a way that the braking torque engendered by one propeller is compensated by the braking torque of the other. Thus the strain on the nacelle's mast is lighter than in the case of a single propeller wind turbine.

Still a further advantage consists in having the multiplier rotate around its own central axis, thereby enhancing the thermal exchange with the surrounding air. As a result, the cooling system may either be considerably reduced, or completely removed.

The invention claimed is:

1. Drive device for a energy input mechanism operating a wind turbine comprising two counter-rotative propellers, the first one being facing the wind flow, while the second one is placed behind the first propeller, the wind turbine including:

an epicycloidal multiplier, a first shaft supporting the first propeller linked to a train of planetary wheels of the epicycloidal multiplier, a second shaft supporting the second propeller linked to the crown wheel of the epicycloidal multiplier, the solar wheel of said epicycloidal multiplier being connected to a third shaft driving the afore-mentioned energy input mechanism, including a braking system that acts simultaneously on the second shaft and on the first shaft, the braking system including a pressure mechanism commanded by an activation mechanism, able to act simultaneously by rubbing against an outer armature of the second shaft to slow it down, able to press against a plurality of tappets located in the radial openings arranged around the second shaft, wherein these tappets rub against an outer armature of the first shaft and slow down the second shaft inside which the first shaft is coaxially placed.

2. Drive device according to claim 1, wherein the pressure mechanism is composed of two half-drums.

3. Drive device according to claim 1, wherein the pressure mechanism is composed of a ribbon braking system.

4. Drive device according to claim 1, wherein the activation mechanism includes at least one hydraulic, pneumatic or electromechanical jack.

5. Drive device according to claim 1, wherein the activation mechanism includes at least one mechanical cam system.

6. Drive device according to claim 1, wherein the epicycloidal multiplier is lodged in the hub of the second propeller.

7. Drive device according to claim 1, wherein the second shaft is hollow and coaxially disposed around the third shaft.

8. Drive device according to claim 1, associated to an energy input mechanism that is an electric generator.

9. Drive device according to claim 1, associated with two propellers that bear different aerodynamic characteristics.

10. Drive device according to claim 9, wherein the outer rotation diameters of both propellers are different.

11. Drive device according to claim 10, wherein the rotation diameter of the first propeller is interior to that of the second propeller.

12. Drive device according to claim 9, wherein at least one of the two propellers rotates around a conical surface that generates an angle alpha with a plane perpendicular to the rotation axis of the propeller.

13. Drive device according to claim 12, wherein angle alpha is below 10°.

14. Drive device according to claim 12, wherein angle alpha is below 5°.

15. Drive device according to claim 12, wherein angle alpha is below 3°.

16. Drive device according to claim 9, wherein the longitudinal axis of each blade is curved.

* * * * *